Feb. 20, 1923.
J. MADER
TRACTOR HITCH
Filed Mar. 12, 1921
1,446,125
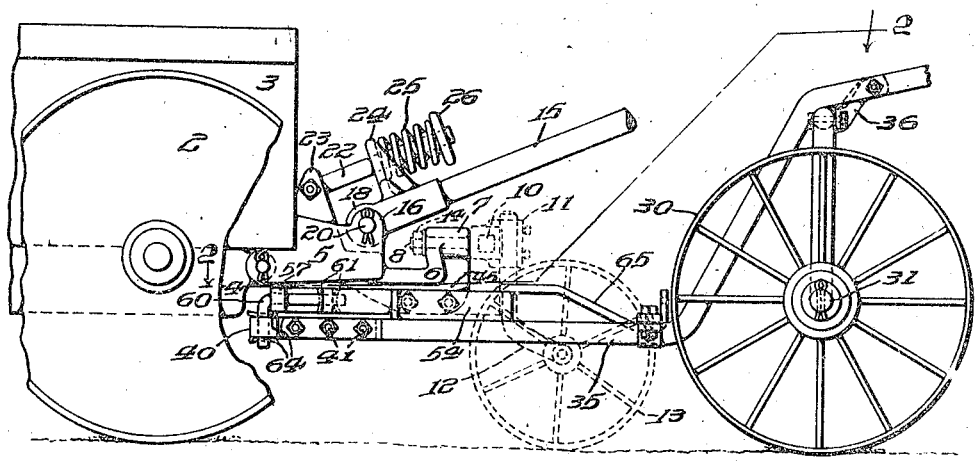
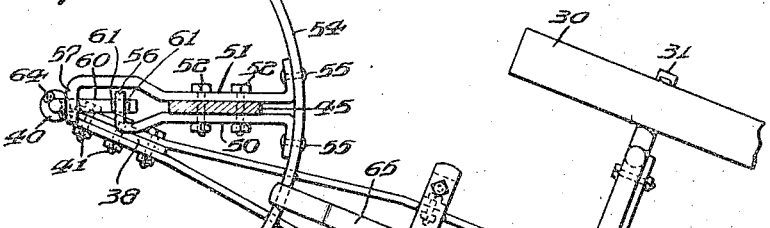
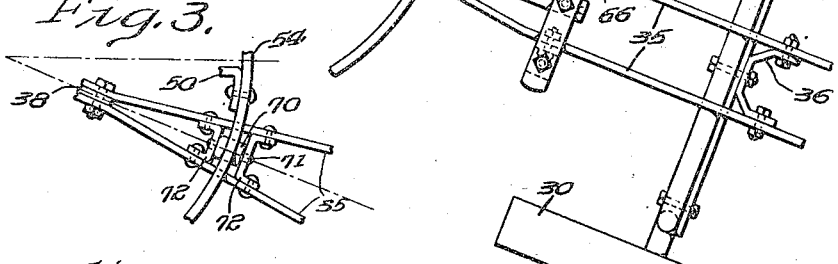
WITNESS
F. J. Hartman.
INVENTOR
Joseph Mader,
BY Blow K, Moulton & Helbert
ATTORNEYS Patented Feb. 20, 1923.

1,446,125

UNITED STATES PATENT OFFICE.

JOSEPH MADER, OF PHILADELPHIA, PENNSYLVANIA, ASSIGNOR TO S. L. ALLEN & CO., INC., A CORPORATION OF PENNSYLVANIA.

TRACTOR HITCH.

Application filed March 12, 1921. Serial No. 451,721.

*To all whom it may concern:*

Be it known that I, JOSEPH MADER, a citizen of the United States, and a resident of the city of Philadelphia, in the county of Philadelphia and State of Pennsylvania, have invented certain new and useful Improvements in Tractor Hitches, of which the following is a specification, reference being had to the accompanying drawing.

The invention relates more particularly to garden tractors which ordinarily comprise suitable power mechanism supported by and movable with a pair of traction wheels, a rearwardly and upwardly extending handle or pair of handles for guiding the tractor and removable caster wheels in the rear of the traction wheels which serve to maintain the equilibrium of the tractor. A tractor of this general character when employed in agricultural operations or the like may be suitably coupled to a trailing implement, such for example, as a cultivator, and which it is effective to draw over the ground. In order to attain the most satisfactory results it is requisite to arrange the coupling means in such manner as to permit relative movement to take place between the tractor and the implement especially when the latter is of a type which is supported on its own wheels, since in the absence of provision for such movement the wheels of the tractor and of the implement are prevented from independently following and accommodating themselves to inequalities in the surface being traversed which results in binding and straining the various parts and in generally unsatisfactory operation.

The principal object of my invention is to provide a simple and effective hitch or coupling means for coupling an agricultural implement or the like to a garden tractor which under operative conditions, will permit the freedom of movement between the implement and the tractor requisite for satisfactory operation in agricultural work or the like. Further objects of my invention are to provide a hitch or coupling means of the character and for the purposes aforesaid which permits the use of the ordinary tractor wheels to be dispensed with, the parts comprising the hitch acting in conjunction with the trailing implement serving to vertically support the tractor in operative position and entirely obviating the necessity for utilizing the caster wheels to effect such support in the ordinary manner. The ability to discard the caster wheels is advantageous in that as the implement wheels are ordinarily further removed from the tractor wheels than are the caster wheels when in their usual position, that portion of the weight of the tractor which under operative conditions in a combination embodying my invention is supported by the implement wheels is less than that ordinarly supported by the caster wheels. Additionally as generally the size of the caster wheels is limited by structural requirements while the size of the implement wheels is not, the latter are made of considerably greater diameter than the former. Thus, as the weight on the drawn wheels is less, and as their diameter is generally greater in an operative combination of tractor and implement coupled together by my improved hitch than in one in which the caster wheels are employed, the power required from the tractor to propel the combination is materially lessened.

My invention further contemplates the production of a hitch or coupling means which can be readily attached to and used in connection with garden tractors of different makes without necessitating material changes therein; which may be readily mounted on or dismounted from the tractor; which is simple in construction, comprises but a relatively small number of parts and is not liable to get out of order or be damaged when in use.

My invention further includes all of the other novel objects and features of construction and arrangement hereinafter more definitely specified and described.

In the accompanying drawing I have illustrated certain embodiments of my invention and have shown them in operative connection with a garden tractor of well known form and serving to connect thereto a typical wheeled trailing implement. As the implement may be of any desired construction I have only shown the wheels and a portion of the frame thereof, and, additionally, as the specific form and details of construction and arrangement of the tractor form no part of the present invention I have, similarly, only illustrated such parts thereof and these in a more or less diagrammatic way, as are necessary to a proper understanding of the invention. It will therefore be understood that the illustration of the tractor proper and of the implement are to be merely considered as typical and that in consequence any form of tractor or implement other than those shown may be employed.

In the said drawing Fig. 1 is a view in side elevation, with certain portions broken away, showing in full lines the tractor and implement connected in operative relation by means of my improved hitch, the position of one of the ordinary caster wheels of the tractor and of its supporting means being indicated in dotted lines, these parts however being preferably removed when the hitch is employed; and Fig. 2 is a horizontal fragmentary section on the line 2—2 in Fig. 1 looking in the direction of the arrows, the implement and its connected parts being swung to the left into angular relation with the center line of the tractor to illustrate the operation of the parts in turning as at the end of the row which is being cultivated. Fig. 3 is a fragmentary detail view generally similar to Fig. 2 but showing a slightly modified form of the invention, and Fig. 4 is a side elevation of the parts shown in Fig. 3 but in a position corresponding to that shown in Fig. 1. Like numerals are used to designate similar parts in the several figures.

The tractor fragmentarily shown in Fig. 1 comprises the traction wheels 2 and hood 3 beneath which, it will be understood, is located the motor and suitable connections therefrom for rotating the wheels, the motor being supported on a suitable frame or housing 4 to which is rigidly secured in any suitable manner a rearwardly projecting casting 5.

The casting may be provided with a rearwardly extending arm 6 directed upwardly at its outer extremity to provide a boss 7 for the reception of a pivot pin 8 which passes horizontally through the boss and serves to support the transversely extending wheel bar 10 which, in turn, normally carries supporting brackets 11 in which are secured vertical portions of the downwardly and rearwardly directed caster wheel supports 12 at the rearmost extremities of which are normally mounted the caster wheels 13 one on each side of the machine. The pin 8 is operatively held in the boss 7 by a nut 14 or in any other suitable way so that it may be readily dismounted therefrom if desired and as is preferable when my improved hitch is being utilized with the tractor.

A pair of preferably rearwardly diverging steering handles 15 are provided and arranged for vertical movement with respect to the casing 5 in any suitable manner, conveniently by providing the casting with laterally spaced upwardly directed ears 16 between which is positioned a casting 18 comprising a pair of laterally spaced rearwardly diverging sockets for the reception of the forward ends of the steering handles, the casting being rotatively supported on the ears by a pivot 20 passing transversely through the ears and through the casting. For yieldingly supporting the weight of the handles a rod 22 may be pivotally supported on a boss 23 formed on the casting 5 and arranged to loosely extend through a boss 24 on the casting 16, a coil spring 25 arranged between the face of the latter boss and an adjusting member 26 preferably threaded onto and movable relatively to the rod, serving to yieldingly resist the tendency of the handles to move downwardly under the action of gravity.

The particular construction and arrangement of the various parts hitherto described and which may be modified as desired as the same form no part of the present invention, will be readily comprehended by those familiar with the art and require no further description.

The implement to be attached to the tractor may comprise supporting wheels 30 carried on an axle 31 or otherwise suitably supported and in the form shown the axle between the wheels is carried upwardly adjacent each wheel and then transversely to form a yoke such as is frequently employed in implements of this character. Extending over and supported on this yoke, thence extending forwardly and angularly downward therefrom and thence horizontally forwardly are a pair of complementary, laterally spaced draft bars 35 constituting draft means, which are rigidly secured to the yoke in any suitable manner as by a bracket 36 bolted to the bars and to the yoke. From the yoke these bars may conveniently extend rearwardly to support the operator's seat (not shown) as the particular form of implement typically illustrated is intended to be ridden by the operator when in use.

Adjacent their forward extremities the draft bars are respectively directed angularly inward and thence in parallel relation so as to snugly receive between them a rearwardly directed fin or web 38 preferably integrally formed with an eye 40 which is provided with a central vertically extending cylindrical aperture. The fin is secured between the forward ends of the bars 35 in any suitable manner conveniently by a plurality of bolts 41.

In the particular form of tractor illustrated, the rearwardly extending arm 6 is provided with an integral downwardly and rearwardly extending and vertically disposed strengthening web or comb 45 which is conveniently employed for the attachment of certain parts of the hitch now to be described, but it will be understood that in the absence of the comb as might well be the case in other makes of tractors, some other portion of the tractor would necessarily be employed for their attachment, said parts under such circumstances being modified if necessary in minor particulars to meet the conditions encountered.

However, when the tractor embodies a web 45 or equivalent part I preferably position on opposite sides thereof brackets 50 and 51 both brackets and the web being drilled for the passage of bolts 52 which conveniently serve to removably secure the brackets on the web. The rear end of each bracket abuts against the forward side of a substantially arcuate member 54, hereinafter more particularly described, and to which it is rigidly secured by one or more rivets 55, while forward of the web the brackets are preferably respectively angularly outwardly offset, thence directed longitudinally and then turned inwardly in opposite directions to provide portions 56 and 57 spaced longitudinally from each other and lying at right angles to the longitudinal center line of the tractor, said portions being provided with aligned holes for the passage of the cylindrical pivot pin 60 which extends horizontally through the holes and is retained in position therein in any convenient way as by cotter pins 61. The forward end of the pivot pin which is preferably substantially L-shaped in side elevation is turned vertically downwardly and rests adjacent the forward face of the portion 57 of the bracket 51, the extremity of this part of the pin being adapted to extend through the eye 40 carried by the draft bars and which is conveniently removably maintained in position thereon by cotter pins 64 positioned above and below the eye and extending through the pivot pin.

In the form of the invention shown in Figs. 1 and 2 the arcuate member 54, which is conveniently formed of a strip of flat steel bent approximately on an arc of which the axis of the vertically extending portion of the pivot pin is the center and positioned on the brackets 50, 51 with its greatest width in the vertical plane, is adapted to contact along its lower edge with the upper surface of the draft bars 35 and thereby, in the absence of the usual caster wheels of the tractor, is effective to vertically support and maintain the equilibrium of the latter. If desired, a preferably, somewhat resilient keeper 65 may be bolted to a transversely extending support 66 or otherwise conveniently attached to the draft bars adjacent its rear end and arranged to contact at its other end with the upper edge of the arcuate member, the keeper thus being effective to force the latter toward the bars 35 if under operative conditions the member should, owing to inequalities in the ground, tend to unduly separate from the bars.

With the several parts constructed preferably substantially as described, it will be apparent that the arcuate member, brackets 50 and 51 and pivot pin may be readily unitarily attached to or removed from the tractor through the medium of the bolts 52; that with these parts in position on the tractor the implement may be readily coupled to the pivot pin or uncoupled therefrom by inserting the pin in the eye 40 or removing it from the eye, and that when so coupled the tractor will be maintained in upright position through the coaction of the arcuate member and draft bars 35. When so coupled to the implement, the tractor may be readily steered in the ordinary manner by swinging the handles 15 to the right or left, under which circumstances a relative turning movement takes place between the implement and the tractor about the vertical portion of the pivot pin, the bars 35 moving along the arcuate member to the right or left as the case may be, while as the tractor moves ahead the draft of the tractor is imparted to the draft bars and thence to the implement through the medium of the bracket 51 and vertical portion of the pivot pin which abuts against the forward face of the portion 57. Furthermore, if, owing to inequalities in the ground or the like, the tractor or implement respectively tend to depart from a vertical portion the pivot pin is free to turn in the brackets on its longitudinal axis and thus permit the implement and tractor to "roll" with respect to each other. As in the form of the invention hitherto described the bars 35 both normally contact with the arcuate member at spaced points, under such conditions one of the bars will of course depart slightly from the arcuate member, the resiliency of the keeper 65 if employed being sufficiently to permit this action to take place without undue binding or straining of the parts. The utmost freedom of movement between the tractor and the implement is therefore possible under operative conditions, both the tractor and the implement being free to assume the different positions required as they move over the unequal surface of the ground, while the steering of the tractor may be readily accomplished by swinging the handles to the right or left in the manner already described.

In the form of the invention shown in Figs. 3 and 4 instead of arranging the arcuate member 54 to contact under normal conditions directly with the upper surfaces of the edges of the draft bars 35, I provide suitable anti-friction means preferably arranged between the bars and in such position as to contact with the lower edge of the arcuate member, which means may conveniently comprise a roller 70 arranged to rotate on a horizontally disposed longitudinally extending axle 71 journaled in supports 72 riveted or otherwise secured in fixed position between or adjacent the bars 35, the diameter of the roller being such that its upper surface will extend slightly above the upper edges of the bars. With the parts so arranged the roller alone contacts with the arcuate member thus minimizing the friction between the bars and the member when the tractor is being steered, while when relative rolling movement occurs between the tractor and the implement the member and roller remain constantly in contact.

While in the particular form of implement which I have typically illustrated the draft bars 35 are directed upwardly and fixedly secured at a relatively high point to the yoke shaped axle of the implement, it will be understood that such an arrangement is in no manner essential as with other types of implements it is frequently more convenient to secure the rear ends of the draft bars or equivalent means to some point relatively low down on the frame or axle of the implement, and hence any suitable and convenient method of attaching the bars to the implement may be employed so long as there is provided a horizontally disposed forwardly extending portion adapted for disposal beneath the arcuate member either for direct contact therewith or contact through the medium of suitable anti-friction means and terminating in an eye or equivalent means for connection with the pin. Moreover it will be understood that the particular form and construction of the tractor itself is immaterial; that the brackets 50 and 51 or equivalent means may be rigidly and preferably removably supported on the tractor in manners other than that shown and that changes and modifications may be made in the form, construction and arrangement of various elements and in the several parts without departing from the spirit and scope of the invention as defined in the appended claims.

Having thus described my invention I claim and desire to protect by Letters Patent of the United States:

1. Means for coupling a trailing implement or the like to a tractor and comprising a bracket adapted for operatively fixed attachment to the tractor, an arcuate member supported at the rear end of the bracket, an L-shaped pivot pin supported adjacent the forward end of the bracket, rotatable on a longitudinally extending horizontal axis and having a vertically extending portion, draft means extending rearwardly to the implement beneath said arcuate member and adapted to support said arcuate member vertically, and means for effecting a movable connection between the vertically extending portion of the pin and said draft means.

2. Means for coupling a trailing implement or the like to a tractor and comprising a bracket adapted for operatively fixed attachment to the tractor, a horizontally and transversely extending member supported by said bracket, a pivot pin comprising portions disposed in angular relation with each other supported adjacent the forward end of the bracket, draft means extending rearwardly to the implement beneath said member and adapted to afford vertical support to said member, and means for effecting a movable connection between the pin and said draft means.

3. Means for coupling a trailing implement or the like to a tractor and comprising a pair of laterally spaced brackets adapted for operatively fixed attachment to the tractor, an arcuate member extending in a horizontal plane and supported at the rear ends of said brackets, the forward ends of said brackets being respectively turned inwardly to provide longitudinally spaced portions, an L-shaped pivot pin journaled in said portions of the brackets and having a vertically extending portion, draft means extending rearwardly to the implement beneath said arcuate member, and means for effecting a horizontally movable connection between the vertically extending portion of the pin and said draft means.

4. Means for coupling the draft means of a trailing implement to a tractor, comprising a member adapted for rigid attachment to the tractor in horizontally disposed transversely extending position, a pivot pin having respectively angularly disposed parts, and means for supporting one part of the pin in front of said member for rotation on a horizontal axis, the other part of the pin when so supported being adapted for connection to said draft means.

5. Means for coupling the draft means of a trailing implement to a tractor, comprising a substantially arcuate member adapted for attachment to the tractor in horizontal and transversely extending position, an L-shaped pivot pin and means for supporting said pin in front of said member for rotation on a horizontal axis and operative to limit the rearward movement of the pin, one end of the pin when so supported being adapted for attachment to said draft means.

6. The combination with a tractor of means for effecting a connection with the draft means of a trailing implement and comprising a transversely extending horizontally disposed member rigid with the tractor, an L-shaped pin and means for supporting said pin in front of said member whereby said pin is free to rotate on a horizontal axis, said supporting means additionally forming a stop for limiting the rearward movement of the pin, one portion of said pin when so supported extending at substantially right angles to the axis of rotation of the other portion and being adapted for operative connection to the draft means of the implement.

In witness whereof, I have hereunto set my hand this 11th day of March, A. D. 1921.

JOSEPH MADER.